United States Patent [19]

Zaitsu

[11] 4,346,650
[45] Aug. 31, 1982

[54] CONTINUOUS-PROCESSING TYPE HOT-WATER STERILIZER AND FOOD COOKER

[75] Inventor: Eizo Zaitsu, Nara, Japan

[73] Assignee: Shinagawa Machinery Works Co., Ltd., Osaka, Japan

[21] Appl. No.: 185,896

[22] Filed: Sep. 10, 1980

[30] Foreign Application Priority Data

Oct. 5, 1979 [JP] Japan ................................ 54/129245

[51] Int. Cl.³ .............................................. A47J 27/08
[52] U.S. Cl. ........................................ 99/361; 99/366; 99/367; 99/370; 99/371; 198/742; 422/304; 426/407
[58] Field of Search ................... 99/359, 360, 361, 367, 99/370, 371, 366, 362; 198/742; 422/302, 304; 426/401, 407, 412

[56] References Cited

U.S. PATENT DOCUMENTS

| 3,478,677 | 11/1969 | Mencacci | 422/302 X |
| 3,481,691 | 12/1969 | Trainham | 99/366 |
| 3,528,826 | 9/1970 | Wilson | 99/362 |
| 4,169,408 | 10/1979 | Mencacci | 99/367 |

FOREIGN PATENT DOCUMENTS 1962428  6/1971  Fed. Rep. of Germany ........ 99/361

*Primary Examiner*—Billy J. Wilhite
*Attorney, Agent, or Firm*—Armstrong, Nikaido, Marmelstein & Kubovcik

[57] ABSTRACT

Continuous-processing type sterilizer and cooker for providing packaged foods completely sterilized with a small heat-energy consumption and retaining the color, fragrance, taste, texture and quality similar to unprepared foods by taking the steps of immersing a product cage, wherein contains the packaged foods, in pressurized hot-water in a sterilization tank, moving the cage within the hot water by means of a drive means for a given period of time, transferring it through a transfer tank from the hot water to a pressurized cooling water in a cooling tank, and moving it within the cooling water by means of a drive means for a given period of time. Both the sterilization tank and the cooling tank are connected to the transfer tank at their one end, the sterilization tank having a preparatory chamber at its other end and the cooling tank having an off-loading chamber at its other end. The chamber is provided with an elevator, lowering or raising within the connecting portion between the chamber and the tank, and separating the chamber from the tank in a manner that the rim of the elevator is bound to the flange of the lower end of the chamber thereby forming an airtight system.

11 Claims, 4 Drawing Figures

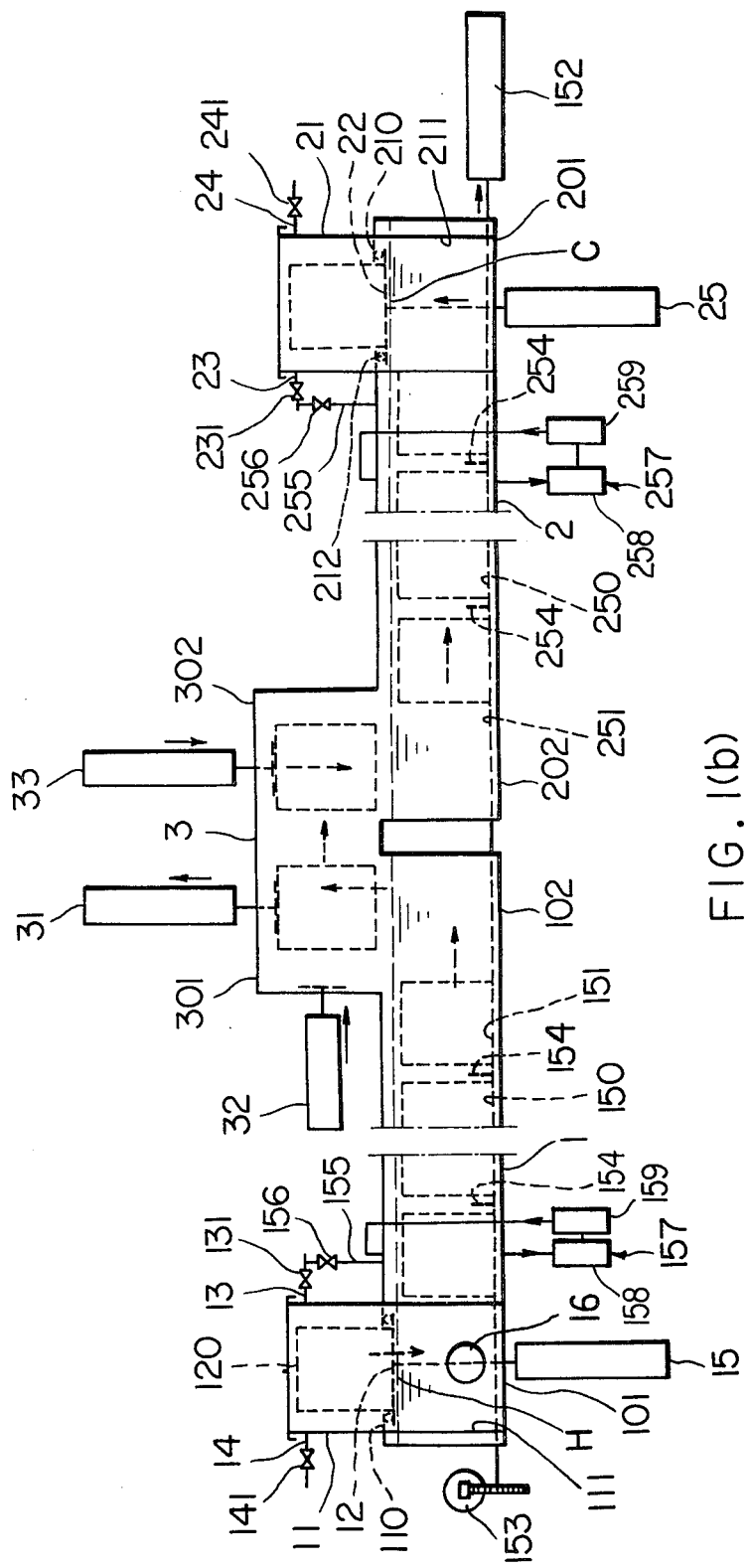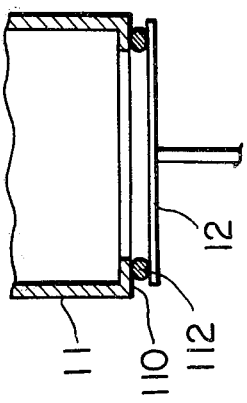
FIG. 1(a)
FIG. 1(b)

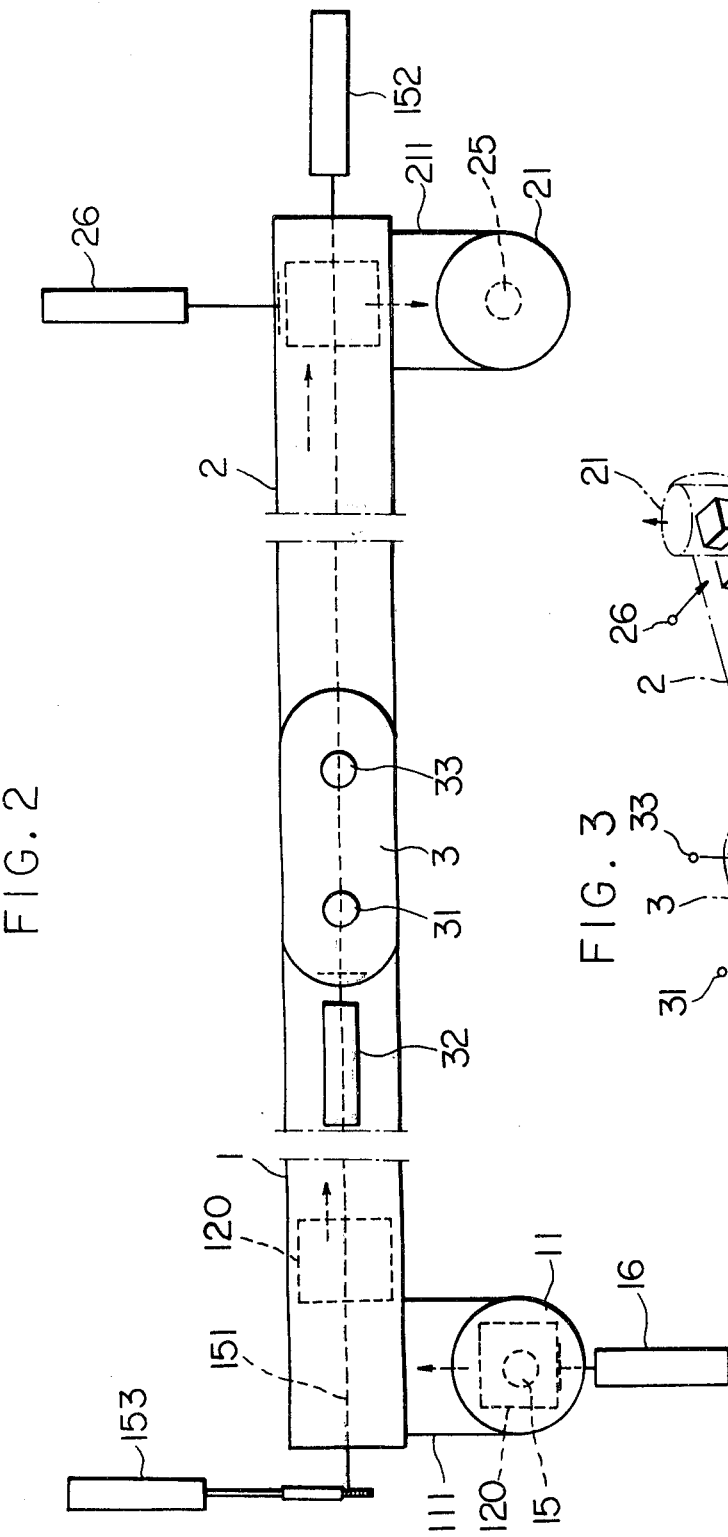

CONTINUOUS-PROCESSING TYPE HOT-WATER STERILIZER AND FOOD COOKER

BACKGROUND OF THE INVENTION

This invention relates to heat-treatment for foods. More particularly, the invention is directed to a continuous-processing type hot-water sterilizer and cooker for insuring sterilization and cooking of packaged foods in a manner such that the foods may retain the color, fragrance, taste, texture and quality similar to unprepared food.

Conventional sterilizers, having both a hot-water tank and a sterilization tank, require an installation of powerful hot-water pumps, large diameter pipes and large-size control valve because they must rapidly circulate hot water between these two tanks. It takes a considerable amount of time for sterilization tank to be filled to a given level with hot water.

This time increases when larger sterilizers are used to accomodate a greater volume of foods to be sterilized. Under this sterilization method, time needed to attain a given high temperature for sterilizing and the time needed to cool the sterilized foods to a given low temperature are considerable and consequently there is an impact on the quality of the foods. Namely, when hot water is placed in the sterilization tank, the foods on the bottom begin to cook immediately, those on the top later. Likewise, when the tank is emptied, the foods on the top lose temperature first, those on the bottom later. Therefore, there is a difference in cooking time between foods placed in the top and bottom of the product cage. Moreover the sterilization tank and its pipe arrangement are heated or cooled alternatively with hot water or cooling water, so that a large amount of heat energy is lost.

SUMMARY OF THE INVENTION

The sterilizer and cooker of this invention which overcome the above discussed and numerous other disadvantages and deficiencies of the prior art relate to a hot-water sterilizer of a continuous-processing type for packaged foods comprising:
(1) a sterilization tank containing hot water therein under a given pressure and having a preparatory chamber at its one end;
(2) a cooling tank containing cooling water therein under a given pressure and having an off-loading chamber at its one end; and
(3) a transfer tank connected to the other end of the sterilization tank at its one end and the other end of the cooling tank at its other end.

The preparatory chamber has a pipe arrangement for injecting and discharging a pressurized gas and an elevator on which a product cage containing packaged foods therein is placed. The elevator lowers or raises within the connecting portion between the chamber and the sterilization tank. The elevator also separates the chamber from the tank in a manner that the rim of the elevator is bound to the flange of the lower end of the chamber by means of a packing material thereby forming an airtight system.

The transfer tank has one transport means for moving the product cage from the other end of the sterilization tank to its one end thereby removing the product cage from the hot water in the sterilization tank, another transport means for moving the product cage from the one end of the transfer tank to the other end of the transfer tank, and yet another transport means for moving the product cage from the other end of the transfer tank to the other end of the cooling tank thereby immersing the product cage in the cooling water in the cooling tank.

The off-loading chamber has a pipe arrangement for injecting and discharging a pressurized gas and an elevator on which the product cage is placed. The elevator lowers or raises within the connecting portion between the chamber and the cooling tank. The elevator also separates the chamber from the cooling tank in a manner that the rim of the elevator is bound to a flange of the lower end of the chamber by means of a packing material thereby forming an airtight system.

Thus, the invention described herein makes possible the objectives as follows:
(a) Foods are completely sterilized by a method which retains the proper color, fragrance, taste, texture and quality of the foods similar to that of foods under natural conditions;
(b) Sterilization is performed under a temperature suitable for the raw materials, condiments and additives used to process foods for a very short time;
(c) All foods placed in the product cage are immersed in hot water without any time difference between the top and bottom of the product cage thereby sterilizing all foods placed in the product cage uniformly, thus insuring an equal cooking time for all foods in the product cage;
(d) All foods placed in the product cage are immersed in cooling water without any time difference between the top and bottom of the product cage thereby cooling all foods placed in the product cage uniformly, thus insuring an equal cooling time for all foods in the product cage;
(e) The sterilizer is applicable to a variety of heating conditions, thereby treating some foods in large quantities and also diverse foods in small quantities;
(f) The sterilizer consumes heat energy only to treat foods, thereby further prompting energy conservation;
(g) The hot water in the sterilization tank is always maintained at a constant temperature because the product cages are driven in an intermittent manner within the hot water thereby creating a stirring operation, thus insuring that sufficiently hot water is in constant contact with the surface of the food containers or envelopes to enhance the efficiency of heat transmission;
(h) The sterilizer has no heat transmission between the high temperature sterilization tank and the low temperature cooling tank because these two tanks are separated therefrom by the transfer tank, thereby raising the thermal efficiency of the overall equipment; and
(i) The sterilizer always unifys the internal temperature of the cooling tank because product cages are driven in an intermittent manner within the cooling water thereby creating a stirring operation, thus insuring that sufficient cooling water is in constant contact with the surface of the food containers or envelopes thereby enhancing the cooling efficiency.

BRIEF DESCRIPTION OF THE DRAWINGS

This invention may be better understood and its numerous objectives and advantages will become apparent to those skilled in the art by reference to the accompanying drawings as follows:

FIG. 1(a) is a side view of a schematic representation of the continuous-processing type hot-water sterilizer and cooker of this invention and FIG. 1(b) is a partial sectional view of the airtight system.

FIG. 2 is a plane view of a schematic representation of the sterilizer and cooker of this invention.

FIG. 3 is a perspective view showing the movement of the product cage in this invention.

DESCRIPTION OF THE PREFERRED EMBODIMENTS

The hot-water sterilizer of this invention has a sterilization tank 1, a cooling tank 2 and a transfer tank 3, as shown in FIG. 1 and FIG. 2. The sterilization tank 1, which contains hot water H under a given pressure, has a preparatory chamber 11 at its one end portion 101. The cooling tank 2, which contains cooling water C under a given pressure, has an off-loading chamber 21 at its one end portion 201. The transfer tank 3 is connected to both the other end portion 102 of the sterilization tank 1 at its one end portion 301 and the other end portion 202 of the cooling tank 2 at its other end portion 302.

The preparatory chamber 11 has an elevator 12 supporting a product cage 120 thereon which contains packaged foods to be sterilized. The elevator 12 lowers or raises within the connecting portion 111 between the preparatory chamber 11 and the sterilization tank 1 and is capable of separating the chamber 11 from the tank 1 in a manner that the rim of the elevator 12 is bound to the flange 110 of the lower end of the chamber 11 by means of a packing material 112 thereby forming an airtight system. The elevator 12 may be driven by an air cylinder 15. The chamber 11 further has a pipe arrangement comprising a pressurized-gas injecting pipe 13 with a valve 131 and a pressurized-gas discharging pipe 14 with a valve 141.

The off-loading chamber 21 likewise has an elevator 22 supporting the product cage 120 thereon and lowering or raising within the connecting portion 211 between the chamber 21 and the tank 2. The elevator 22 is also capable of separating the chamber 21 from the tank 2 in a manner that the rim of the elevator 22 is bound to the flange 210 of the lower end of the chamber 21 by means of a packing material 212 thereby forming an airtight system. The elevator 22 may be driven by an air cylinder 25. The chamber 21 further has a pipe arrangement, which comprises a pressurized-gas injecting pipe 23 with a valve 231 and a pressurized-gas discharging pipe 24 with a valve 241.

The sterilization tank 1 further has a drive means 150 for moving the product cage 120 within the hot water H from the one end portion 101 thereof to the other end portion 102 thereof. The drive means 150 comprises a transport means 151 reciprocatable and rotatable on guide rails (not shown in drawings) ranging from the one end to the other end of the sterilization tank 1. The guide rails may be extended to the end 201 of the cooling tank 2. The drive means 150 also comprises air cylinders or hydraulic cylinders 152 and 153. The cylinder 152 is a cylinder for moving the transport means 151 in a reciprocating manner. The other cylinder 153 is a cylinder for rotating the transport means 151. The transport means 151 is provided with a locking means such as plural detents 154. The locking means also ensures a uniform spacing between contiguous product cages 120 on the transport means 151 during the transport of the product cage 120 in the sterilization tank 1. Upon rotating the transport means 151 by the cylinder 153, the product cage 120 becomes free from the locking means. The sterilization tank 1 also has a pipe arrangement 155 with a valve 156 for injecting a pressurized gas into the tank 1 and a circulation means 157 for circulating the hot water H. The circulation means 157 has a pump 158 and heating means 159 to maintain the hot water at a given temperature.

The transfer tank 3 has transport means 31, 32 and 33. The first transport means 31 is an air cylinder for moving the product cage 120 from the transport means 151 at the end portion 102 of the sterilization tank 1 to the one end portion 301 of the transfer tank 3 thereby removing the product cage 120 from the hot water H in the sterilization tank 1. The second transport means 32 is an air cylinder for moving the product cage 120 from the one end portion 301 of the transfer tank 3 to the other end portion 302 thereof. The third transport means 33 is an air cylinder for moving the product cage 120 from the other end portion 302 of the transfer tank 3 to the end portion 202 of the cooling tank 2 thereby immersing the product cage 120 in the cooling water C in the cooling tank 2.

The cooling tank 2 has a drive means 250 for moving the product cage 120 within the cooling water C from the one end portion 202 thereof to the other end portion 201 thereof. The drive means 250 comprises a transport means 251 reciprocatable and rotatable on guide rails (not shown) ranging from the end portion 202 to the other end portion 201 of the tank 2. The transport means 251 may be connected to the transport means 151 in the sterilization tank 1. The transport means 251 has a locking means such as plural detents 254 locking the product cage 120 therewith on the transport means 251 during the transport of the porduct cage 120 in the cooling tank 2. This locking means also ensures a uniform spacing between contiguous product cages 120. The product cage 120 becomes free from the locking means by rotating the transport means 251 by the air cylinder 153. The cooling tank 2 also has a pipe arrangement 255 with a valve 256 for injecting a pressurized gas and a circulation means 257 for circulating the cooling water C. The circulation means 257 has a pump 258 and a heat-exchanger 259 to maintain the cooling water at a given temperature.

The hot water H in the sterilization tank 1 usually is at a temperature ranging from about 105° C. to about 140° C. The cooling water C in the cooling tank 2 is usually at a temperature of around 20° C. The internal pressure of the tanks 1 and 2 is under about 1.2 to 3.6 atmospheric pressure. The pressurized gas is usually selected from the group consisting of air, nitrogen and the inert gases.

Using the abovementioned sterilizer of this invention, the packaged foods are sterilized and cooked, as shown in FIG. 3, through the steps comprising:

(1) placing the product cage 120, containing the packaged foods, on the first elevator 12 in a preparatory chamber 11; the chamber 11 being connected to the one end of the sterilization tank 1 at its lower end containing hot water H, and the elevator 12 lowering and raising within the connecting portion 111 between the chamber 11 and the tank 1 and separating the chamber 11 from the tank 1 in a manner that the rim of the elevator 12 is bound to the flange of the lower end of the chamber 11 through the packing material 112 thereby forming an airtight system, (2) closing the lid of the preparatory chamber 11 in an airtight manner, (3) injecting a pressurized gas into the preparatory chamber 11, thereby making the internal pressure of the chamber equivalent to a given pressure within the sterilization tank 1, (4) lowering the elevator 12 by means of the cylinder 15 and then moving the product cage 120 from the elevator 12 to the drive means 150 at the end 101 of the sterilization tank 1 through the connecting portion 111 by means of another cylinder 16, thereby quickly immersing the product cage 120 in the hot water H of the sterilization tank 1, (5) locking the product cage 120 to the drive means 150 by means of the locking means, (6) moving the product cage 120 immersed in the hot water H, more preferably in an intermittent manner, by means of the drive means 150 from the one end of the sterilization tank to the other end of the sterilization tank over a given period of time, (7) transferring the product cage 120 from the sterilization tank 1 to the transfer tank 3, which is connected to the other end 102 of the sterilization tank 1, thereby removing the product cage 120 from the hot water H in the sterilization tank 1, (8) transferring the product cage 120 from the transfer tank 3 to the cooling tank 2 containing cooling water C under a given pressure, thereby quickly immersing the product cage 120 in the cooling water C; the transfer tank 3 passing through the one end 202 of the cooling tank 2, (9) moving the product cage 120 immersed in the cooling water C, more preferably in an intermittent manner, by means of the drive means 250 from the one end 202 of the cooling tank 2 to the other end 201 of the cooling tank 2 over a given period of time,

(10) removing the product cage 120 from the drive means 250 by means of the cylinder 153,

(11) moving the product cage 120 from the other end 201 of the cooling tank 2 to the second elevator 22 through the connecting portion 211 by means of another cylinder 26,

(12) raising the second elevator 22 to free the product cage 120 from the cooling water C and further to separate the off-loading chamber 21 from the cooling tank 2 in a manner that the rim of the elevator 22 is bound to the flange 210 of the lower end of the off-loading chamber 21 to form an airtight system; the off-loading chamber 21 being connected to the other end 201 of the cooling tank at its lower end and the off-loading opening of the off-loading chamber 21 being closed in advance with its lid to hold its internal pressure equivalent to that of the cooling tank 2,

(13) opening the lid of the off-loading chamber 21 thereby making the internal pressure of the chamber equal to the atmospheric pressure, and

(14) off-loading the product cage 120 from the second elevator 22.

This system may be completely controlled by means of a computer incorporated therein.

I claim:

1. A hot-water sterilizer and cooker of the continuous processing type for sterilizing and cooking food in packages held in product cages comprising (1) a sterilization tank containing hot water therein under a given pressure, said tank including a first end, a second end, a preparatory chamber having pipe means connected thereto for injecting and discharging pressurized gas into and from the preparatory chamber and an elevator on which one of the product cages containing food packages can be placed, a connecting portion connecting said first end of said sterilization tank and said preparatory chamber, pipe means connected to the sterilization tank for injecting pressurized gas thereinto, hot-water circulation means connected to the sterilization tank for circulating hot water in the circulation tank, and drive means for intermittently moving the product cage immersed in the hot water through the sterilization tank from the first end to the second end thereof thereby stirring the hot water and ensuring that sufficient hot water is in constant contact with the food packages to enhance the efficiency of heat transmission, (2) a cooling tank containing cooling water therein under a given pressure and having a first end, a second end, and an off-loading chamber connected to the second end of the cooling tank, and (3) a transfer tank having two ends, said transfer tank being connected at one end thereof to said second end of the sterilization tank and at the other end thereof to said first end of the cooling tank.

2. The sterilizer and cooker of claim 1, wherein the preparatory chamber has a lower end having an opening and a flange surrounding the opening, and said elevator has a first platform, means operatively associated with the platform for raising and lowering the platform in the connecting portion, and means for gas-tightly sealing the platform to the flange of the opening in the lower end of the preparatory chamber when the platform is in a raised position.

3. The sterilizer and cooker of any one of claims 1, or 2, wherein the drive means for intermittently moving the product cage includes transport means reciprocatably and rotatably mounted in the sterilization tank having means for intermittently locking the product cages in the sterilization tank to the transport means, means for reciprocatingly moving the transport means, and means for rotating the transport means for engaging and freeing the locking means on the product cages.

4. The sterilizer and cooker of claim 3, wherein the transfer tank further includes first transfer means for removing a product cage from the second end of the sterilization tank thereby removing the product cage with the food packages therein from the hot water, second transfer means for moving a product cage from said first transfer means at one end of the transfer tank to the other end of the transfer tank, and third transfer means for receiving a product cage from the second transfer means and moving the product cage so received into the first end of the cooling tank thereby immersing the product cage with the food packages therein in the cooling water in the cooling tank.

5. A hot-water sterilizer and cooker of the continuous-processing type for sterilizing and cooking food in packages held in product cages comprising:

(1) a sterilization tank containing hot water therein at a given pressure and having a first end, a second end, and a preparatory chamber connected to the first end of the sterilization tank, (2) a cooling tank containing cooling water therein at a given pressure, said cooling tank including a first end, a second end, an off-loading chamber having pipe means connected thereto for injecting and discharging pressurized gas into and from the off-loading chamber and an elevator on which one of the product cages containing the food packages can be placed, a connecting portion connecting said second end of said cooling tank and said off-loading chamber, pipe means connected to the cooling tank for injecting pressurized gas thereinto, cooling water circulation means connected to the cooling tank for circulating cooling water in the cooling tank, and drive means for intermittently moving the product cage immersed in the cooling water through the cooling tank from said first end to said second end thereof thereby stirring the cooling water and ensuring that sufficient cooling water is in constant contact with the food packages to enhance the cooling efficiency, and (3) a transfer tank having two ends, said transfer tank being connected at one end thereof to said second end of the sterilization tank and at the other end thereof to said first end of the cooling tank.

6. The sterilizer and cooker of claim 5, wherein the off-loading chamber has a lower end having an opening and a flange surrounding the opening, and the elevator has a platform, means operatively associated with the platform for raising and lowering the platform in the connecting portion, and means for gas-tightly sealing the platform to the flange of the opening in the lower end of the off-loading chamber when the platform is in a raised position.

7. The sterilizer and cooker of any one of claims 1, 2, 5, or 6, wherein the transfer tank further includes first transfer means for removing a product cage from the second end of the sterilization tank thereby removing the product cage with the food packages therein from the hot water, second transfer means for moving a product cage from said first transfer means at one end of the transfer tank to the other end of the transfer tank, and said third transfer means for receiving a product cage from the second transfer means and moving the product cage so received into the first end of the cooling tank thereby immersing the product cage with the food packages therein in the cooling water in the cooling tank.

8. The sterilizer and cooker of any one of claims 5, or 6, wherein the drive means for intermittently moving the product cage includes transport means reciprocatably and rotatably mounted in the cooling tank having means for intermittently locking the product cages in the cooling tank to the transport means, means for reciprocatingly moving the transport means, and means for rotating the transport means for engaging and freeing the locking means on the product cages.

9. The sterilizer and cooker of claim 8, wherein the transfer tank further includes first transfer means for removing a product cage from the second end of the sterilization tank thereby removing the product cage with the food packages therein from the hot water, second transfer means for moving a product cage from said first transfer means at one end of the transfer tank to the other end of the transfer tank, and third transfer means for receiving a product cage from the second transfer means and moving the product cage so received into the first end of the cooling tank thereby immersing the product cage with the food packages therein in the cooling water in the cooling tank.

10. A hot-water sterilizer and cooker of the continuous-processing type for sterilizing and cooking food in packages held in produce cages comprising:

(1) a tunnel-like sterilization tank containing hot water therein under a given pressure, said tank including a first end, a second end, a preparatory chamber having pipe means connected thereto for injecting and discharging pressurized gas into and from the preparatory chamber and a first elevator on which one of the product cages containing food packages can be placed, a first connecting portion connecting said first end of sterilization tank and said preparatory chamber, pipe means connected to the sterilization tank for injecting pressurized gas thereinto, hot-water circulation means connected to the sterilization tank for circulating hot water in the sterilization tank, and first drive means for intermittently moving the product cage immersed in the hot water through the sterilization tank from said first end to said second end thereof thereby stirring the hot water and ensuring that sufficient hot water is in constant contact with the food packages to enhance the efficiency of heat transmission, said preparatory chamber having a lower end having an opening and a flange surrounding the opening, said first elevator having a first platform, means operatively associated therewith for raising and lowering the first platform in the first connecting portion, and means for gas-tightly sealing the first platform to the flange of the opening in the lower end of the preparatory chamber when the first platform is in a raised position, said hot-water circulation means having heating means, said first drive means including first transport means reciprocatably and rotatably mounted in the sterilization tank having first means for intermittently locking the product cages in the sterilization tank to the first transport means, means for reciprocatingly moving the first transport means, and means for rotating the first transport means for engaging and freeing the first locking means on the product cages;

(2) a tunnel-like cooling tank containing cooling water therein under a given pressure, said cooling tank including a first end, a second end, an off-loading chamber having pipe means connected thereto for injecting and discharging pressurized gas into and from the off-loading chamber and a second elevator on which one of the product cages containing the food packages can be placed, a second connecting portion connecting said second end of said cooling tank and said off-loading chamber, pipe means connected to the cooling tank for injecting pressurized gas thereinto, cooling water circulation means connected to the cooling tank for circulating cooling water in the cooling tank, and second drive means for intermittently moving the product cage immersed in the cooling water through the cooling tank from said first end to said second end thereof thereby stirring the cooling water and ensuring that sufficient cooling water is in constant contact with the food packages to enhance the cooling efficiency, said off-loading chamber having a lower end having an opening and a flange surrounding the opening, said second elevator having a second platform, means operatively associated therewith for raising and lowering the second platform in the second connecting portion, and second means for gas-tightly sealing the second platform to the flange of the opening in the lower end of the off-loading chamber when the second platform is in a raised position.

said cooling water circulation means having a heatexchanger.

said second drive means including second transport means reciprocatably and rotatably mounted in the cooling tank having second means for intermittently locking the product cages in the cooling tank to the second transport means, means for reciprocatingly moving the second transport means, and means for rotating the second transport means for engaging and freeing the second locking means on the product cages; and (3) a transfer tank having two ends, said transfer tank being connected at one end thereof to said second end of the sterilization tank and at the other end thereof to the first end of the cooling tank, said transfer tank including first transfer means for removing a product cage from the second end of the sterilization tank thereby removing the product cage with the food packages therein from the hot water, second transfer means for moving a product cage from said first transfer means at one end of the transfer tank to the other end of the transfer tank, and third transfer means for receiving a product cage from the second transfer means and moving the product cage so received into the first end of the cooling tank thereby immersing the product cage with the food packages therein in the cooling water in the cooling tank.

11. In a hot-water sterilizer and cooker of the continuous-process type for sterilizing and cooking food in packages held in product cages which includes a tank under a given pressure and having water therein of a temperature for treating the food packages, said tank including two ends, a chamber having pipe means connected thereto for injecting and discharging pressurized gas into and from the chamber and an elevator on which one of the product cages containing food packages can be placed, a connecting portion connecting one end of the tank and the chamber, pipe means connected to the tank for injecting pressurized gas thereinto, and drive means for moving the product cage immersed in the water through the tank from one end to the other of the tank, the improvement wherein, the chamber has a lower end having an opening and a flange surrounding the opening, and the elevator comprises a platform, means operatively associated with the platform for raising and lowering the platform in the connecting portion, and means for gas-tightly sealing the platform to the flange when the platform is in a raised position.

* * * * *